US012482233B2

(12) United States Patent
Uwano (10) Patent No.: US 12,482,233 B2
(45) Date of Patent: Nov. 25, 2025

(54) MACHINE LEARNING DEVICE, CLASSIFICATION DEVICE, AND CONTROL DEVICE (71) Applicant: FANUC CORPORATION, Yamanashi (JP)

(72) Inventor: Tomofumi Uwano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 251 days.

(21) Appl. No.: 18/287,085

(22) PCT Filed: May 7, 2021

(86) PCT No.: PCT/JP2021/017578
§ 371 (c)(1),
(2) Date: Oct. 16, 2023

(87) PCT Pub. No.: WO2022/234678
PCT Pub. Date: Nov. 10, 2022

(65) Prior Publication Data
US 2024/0193919 A1    Jun. 13, 2024

(51) Int. Cl.
*G06V 40/20* (2022.01)
*G06Q 10/0631* (2023.01)
(Continued)

(52) U.S. Cl.
CPC . *G06V 10/7715* (2022.01); *G06Q 10/063114* (2013.01); *G06V 20/46* (2022.01); *G06V 40/20* (2022.01)

(58) Field of Classification Search
CPC .... G06V 10/7715; G06V 20/46; G06V 40/20; G06Q 10/063114; G06T 7/246;
(Continued)

(56) References Cited

U.S. PATENT DOCUMENTS

2020/0082210 A1    3/2020   Watson et al.
2021/0182605 A1*   6/2021   Anthony ............... G08G 1/012

FOREIGN PATENT DOCUMENTS

CN    106778796        5/2017
CN    110298210 A  * 10/2019 ............. G06F 18/24
(Continued)

OTHER PUBLICATIONS

International Search Report issued Jul. 6, 2021 in corresponding International Application No. PCT/JP2021/017578.
(Continued)

*Primary Examiner* — Carol W Chan
(74) *Attorney, Agent, or Firm* — Wenderoth, Lind & Ponack, L.L.P.

(57) ABSTRACT

A machine learning device comprises: a video data feature extraction unit that extracts a feature of an action performed by a worker from video data; a training data extraction unit that assigns the video data with a label indicating work details of a specific action to extract training data; an operation data feature extraction unit that extracts a feature relevant to the extracted training data from operation data; a label assignment criteria creation unit that creates label assignment criteria for video data and operation data; a label assignment unit that assigns labels to unlabeled video data and operation data on the basis of the label assignment criterias for video data and operation data; and a training unit that executes machine learning using training data including labelled video data to generate a trained model for classifying work of a worker on the basis of video data.

7 Claims, 7 Drawing Sheets (51) Int. Cl.
*G06V 10/77* (2022.01)
*G06V 20/40* (2022.01)

(58) Field of Classification Search
CPC . G06T 2207/20076; G06T 2207/20081; G06T 2207/20084; G06T 2207/30196; G06N 20/00
See application file for complete search history.

(56) References Cited

FOREIGN PATENT DOCUMENTS

| | | |
|---|---|---|
| CN | 111563424 | 8/2020 |
| JP | 2006-209468 | 8/2006 |
| JP | 2018-198028 | 12/2018 |
| JP | 2020-144660 | 9/2020 |

OTHER PUBLICATIONS

Daiki Kawamori et al., "Semi-Supervised Temporal Segmentation of Industrial Operation Video based on Deep Metric Learning", [online] 2020, vol. 119, No. 481, PRMU2019-92, pp. 139-144, [retrieved on May 19, 2020], internet <URL: https://www.ieice.org/ken/user/index.php?cmd=download&p=leCC&t=IEICE-PRMU&l=57df8fa478d645fb26045e2762d2ba89277851794f79f693de48961f1887ea26&lang, ISSN 2432-6380, IEICE Technical Report, outline, chapters 2-4, Published on Mar. 9, 2020 (with machine translation).

Sugano Kousuke et al., "Motion detection and classification method from multidimensional time-series data", DEIM Forum 2016 G4-5, published in 2016 (with machine translation).

Shouhei Uezono et al., "Feature extraction using LSTM Autoencoder for multimodal sequential data", JSAI Technical Report, SIG-KBS-B802-01, published in 2018 (with machine translation).

* cited by examiner

| STAND-BY | SETUP (PRODUCT A) | CLEAN-ING | TOOL EXCHANGE | ... |

TRAINING DATA (SETUP)

VIDEO DATA:

OPERATION DATA:

・OPERATION STATE

・CHUCK OPENING/ CLOSING SIGNAL

FIG. 6B

TRAINING DATA (TOOL EXCHANGE)

VIDEO DATA:

OPERATION DATA:

・OPERATION STATE

・CHUCK OPENING/ CLOSING SIGNAL

MACHINE LEARNING DEVICE, CLASSIFICATION DEVICE, AND CONTROL DEVICE

TECHNICAL FIELD

The present invention relates to a machine learning device, a classification device, and a control device.

BACKGROUND ART

In a production site such as a factory, in order to improve work efficiency, motions performed by workers working in a production line are analyzed for improvement of the production equipment, contents of work, and the like.

For example, a technique has been proposed in which a worker wears a sensor or a laser, the worker is imaged by a video camera, tact unit work and minimum unit work are extracted from tracking data measured by each of the sensor, the laser, and the video camera, a feature vector is calculated from the extracted minimum unit work, analytic processing is performed on a working motion performed by the worker based on the calculated feature vector, and a work error, a change in the worker's posture, a substantial work time, and the like are detected. See, for example, Patent Document 1.

Patent Document 1: Japanese Unexamined Patent Application, Publication No. 2006-209468

DISCLOSURE OF THE INVENTION

Problems to be Solved by the Invention

Since work such as setups varies depending on factories and machines, it is necessary to prepare training data for each site and each machine in order to generate a trained model and a classifier that make accurate determination.

However, a large amount of training data is required to perform deep learning for generating such a trained model and a classifier, and it takes time and effort to collect the training data.

Under the foregoing circumstances, there is a demand for a technique for generating a trained model having high determination accuracy even using a small amount of training data.

Means for Solving the Problems (1) One aspect of the present disclosure is directed to a machine learning device including: a video data feature extraction unit configured to extract features representing motions performed by a worker from video data captured by at least one camera and including the worker; a training data extraction unit configured to in a case of extracting a feature representing a specific motion that is pre-registered, from among the features extracted by the video data feature extraction unit, label a piece of the video data corresponding to the extracted specific motion with a work content indicated by the extracted specific motion, and extract training data including a set of input data that is the labeled piece of the video data and label data indicating the work content; an operation data feature extraction unit configured to extract, from operation data regarding a machine tool, a feature related to the extracted training data; a labeling criterion creation unit configured to create a labeling criterion for video data and a labeling criterion for operation data based on the feature of the piece of the video data included in the extracted training data and the feature extracted from the operation data; a labeling unit configured to label an unlabeled piece of the video data and an unlabeled piece of the operation data based on the labeling criterion for video data and the labeling criterion for operation data; and a learning unit configured to perform machine learning using the training data including the piece of the video data labeled by the labeling unit, and generates a trained model that classifies work that is being conducted by a worker from inputted video data.

(2) One aspect of the present disclosure is directed to a classification device including: a trained model generated by the machine learning device according to (1); an input unit configured to receive an input of video data captured by at least one camera and including a worker; and a work determination unit configured to determine, based on the trained model, work conducted by the worker from the video data received by the input unit.

(3) One aspect of the present disclosure is directed to a control device including the classification device according to (2).

Effects of the Invention

According to the one aspect of the present disclosure, a trained model having high determination accuracy can be generated even using a small amount of training data.

PREFERRED MODE FOR CARRYING OUT THE INVENTION

One embodiment of the present disclosure will be described with reference to the drawings. In the following, a machine tool as an industrial machine will be described as an example. It should be noted that the present invention is also applicable to industrial machines such as an industrial robot, a service robot, a forging press, and an injection molding machine.

One Embodiment

Figure 1:
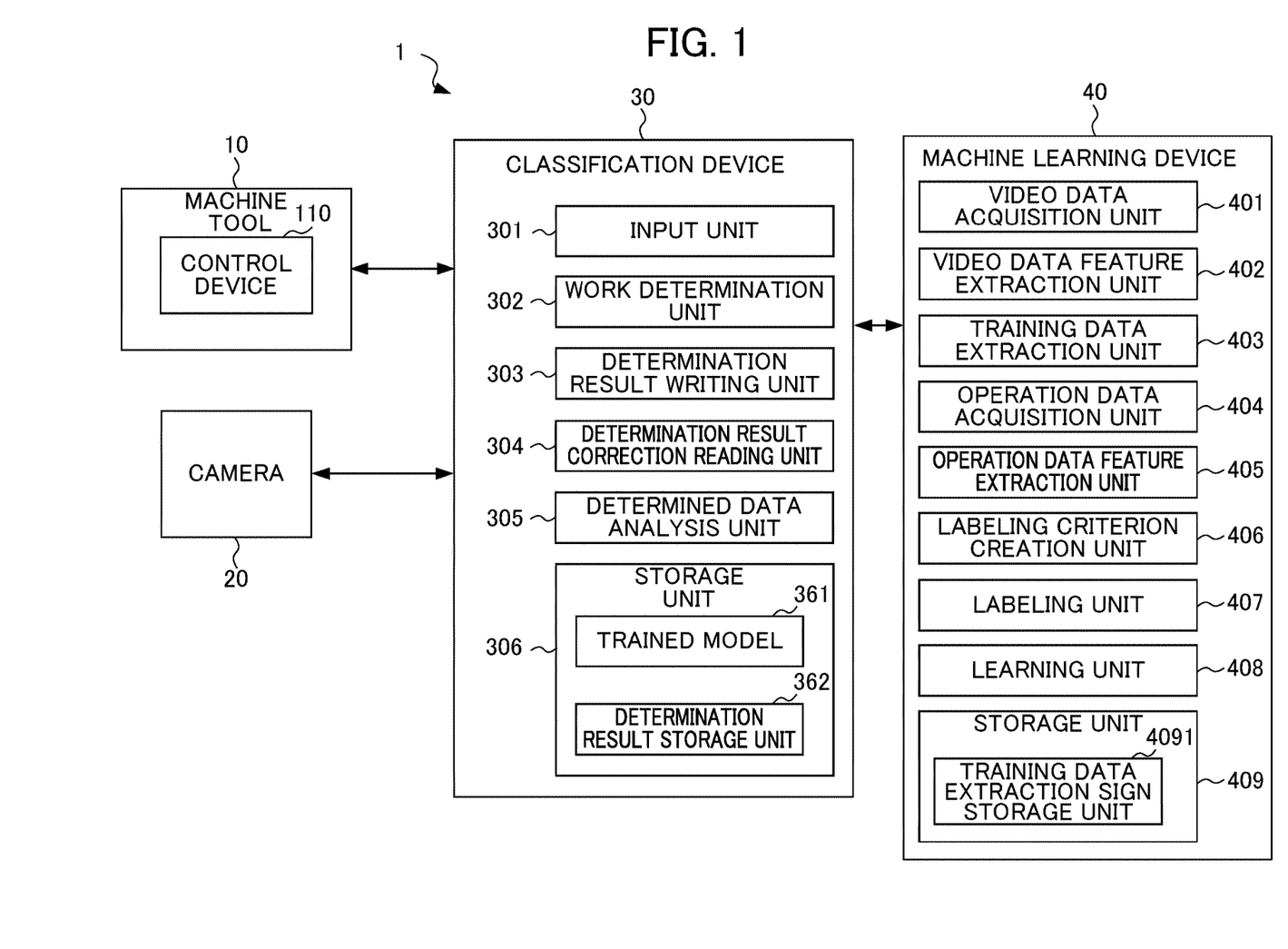
FIG. 1 is a functional block diagram illustrating a functional configuration example of a control system according to an embodiment.

FIG. 1 is a functional block diagram illustrating a functional configuration example of a control system according to one embodiment. As illustrated in FIG. 1, the control system 1 includes a machine tool 10, a camera 20, a classification device 30, and a machine learning device 40.

The machine tool 10, the camera 20 for capturing images (moving image) at a predetermined frame rate, the classification device 30, and the machine learning device 40 may be connected directly to each other via a connection interface (not shown). Alternatively, the machine tool 10, the camera 20, the classification device 30, and the machine learning device 40 may be connected to each other via a network (not shown) such as a local area network (LAN) or the Internet. In this case, the machine tool 10, the camera 20, the classification device 30, and the machine learning device 40 are each provided with a communication unit (not shown) for establishing mutual communication via such connection. As will be described later, a control device 110 included in the machine tool 10 may include the classification device 30 and the machine learning device 40.

The machine tool 10 is a machine tool known to those skilled in the art, and includes the control device 110. The machine tool 10 operates based on an operation command from the control device 110.

The control device 110 is, for example, a numerical control device known to those skilled in the art, generates operation commands based on control information, and transmits the generated operation commands to the machine tool 10. In this way, the control device 110 controls the operation of the machine tool 10.

Specifically, the control device 110 controls and causes the machine tool 10 to perform predetermined machining. The control device 110 is provided with a machining program describing the operation of the machine tool 10. Based on the provided machining program, the control device 110 generates operation commands including a movement command for each shaft, a rotation command for a motor that drives a spindle, and the like, and transmits the operation commands to the machine tool 10, thereby controlling the motor of the machine tool 10. In this way, predetermined machining is performed by the machine tool 10.

Furthermore, the control device 110 transmits operation data regarding the machine tool 10 including operation commands, opening and closing of a door, a torque value for the motor, and the like to the classification device 30. Furthermore, based on a clock signal from a clock (not shown) included in the control device 110, the control device 110 may add, to the operation data, clock time information indicating a clock time at which the operation command, the opening/closing of the door, the torque value for the motor, or the like has been measured, and then, output the operation data to the classification device 30. For example, the control device 110 may check clock time of a clock (not shown) included in the camera 20, which will be described later, at predetermined time intervals to thereby achieve synchronization between the camera and the control device.

In a case where the machine tool 10 is a robot or the like, the control device 110 may be a robot control device or the like.

Equipment to be controlled by the control device 110 is not limited to the machine tool 10 or the robot, and the control device 110 can be widely applied to general industrial machines. The industrial machines include, for example, various machines such as a machine tool, an industrial robot, a service robot, a forging press, an injection molding machine, etc.

In the present embodiment, a numerical control device is described as an example of the control device 110.

The camera 20 is, for example, a digital camera such as a surveillance camera, and is installed in a factory where the machine tool 10 is disposed. The camera 20 captures frame images at a predetermined frame rate, and outputs the captured images as a video to the classification device 30. Furthermore, the camera 20 acquires a clock time at which each frame image has been captured based on a clock signal from the clock (not shown) included in the camera 20, adds time information indicating the acquired clock times to the video, and outputs the video to the classification device 30.

Figure 2:
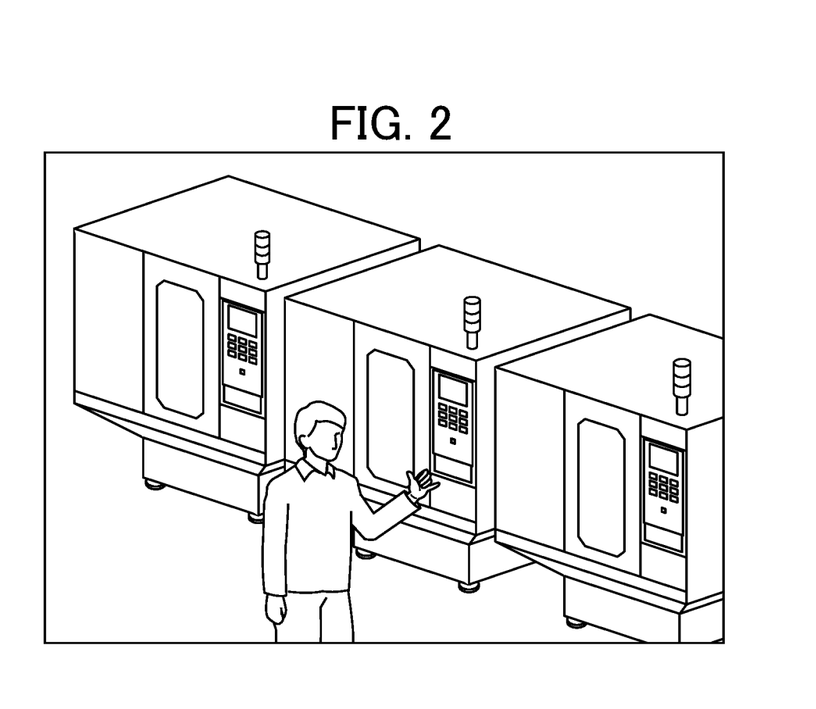
FIG. 2 is a diagram illustrating an example of a video captured by a camera.

FIG. 2 is a diagram illustrating an example of a video captured by the camera 20. FIG. 2 shows an image of three machine tools 10 captured by the camera 20.

Although FIG. 1 illustrates a case where one camera 20 is installed, two or more cameras 20 may be installed to capture a video of the machine tool (s) 10.

In an operation phase, the classification device 30 may acquire the video captured by the camera 20 and having time information added thereto. Furthermore, for example, the classification device 30 may acquire operation data regarding the machine tool 10 from the control device 110. The classification device 30 can determine (classify) the content of work that a worker in the video is conducting with respect to the machine tool 10 by inputting the acquired video to a trained model provided from the machine learning device 40, which will be described later.

Furthermore, the classification device 30 may transmit the acquired operation data regarding the machine tool 10 and the video data captured by the camera 20 to the machine learning device 40, which will be described later.

Moreover, in the operation phase, the classification device 30 may receive a trained model generated by the machine learning device 40, which will be described later, and input the video data captured by the camera 20 to the received trained model to thereby determine (classify) the content of work that is conducted by the worker in the video, and display the determination result on a display unit (not shown) such as a liquid crystal display included in the control device 110. When there is an error in the determination result, the classification device 30 may acquire a correct work content inputted to the control device 110, and output to the machine learning device 40 a set of input data that is the determined piece of the video data and label data indicating the acquired correct work content, thereby causing the machine learning device 40 to update the trained model.

Before describing the classification device 30, machine learning for generating a trained model will be described.

<Machine Learning Device 40>

For example, the machine learning device 40 acquires video data captured by the camera 20, and extracts features representing motions of a worker from the acquired video data, as will be described later.

In a case a feature representing a hand gesture as a pre-registered specific motion of the worker is extracted from among the extracted features, as will be described later, the machine learning device 40 labels a piece of the video data corresponding to the extracted hand gesture with a work content indicated by the extracted hand gesture, and extracts training data that is a set of input data that is the labeled piece of the video data and label data indicating the work content.

Furthermore, as will be described later, the machine learning device 40 acquires operation data regarding the machine tool 10, extracts a feature related to the above-described training data from the acquired operation data, and creates a labeling criterion for video data and a labeling criterion for operation data, based on the extracted feature of the training data and the extracted feature of the operation data.

The machine learning device 40 labels at least an unlabeled piece of the video data, based on the labeling criterion for video data and the labeling criterion for operation data.

The machine learning device 40 performs supervised learning using the training data including newly labeled piece of the video data, and constructs a trained model, which will be described later.

In this way, the machine learning device 40 can construct a trained model having high determination accuracy even using a small amount of training data, and can provide the constructed trained model to the classification device 30.

The machine learning device 40 will be specifically described below.

As illustrated in FIG. 1, the machine learning device 40 includes a video data acquisition unit 401, a video data feature extraction unit 402, a training data extraction unit 403, an operation data acquisition unit 404, an operation data feature extraction unit 405, a labeling criterion creation unit 406, a labeling unit 407, a learning unit 408, and a storage unit 409.

The storage unit 409 is, for example, a read only memory (ROM), a hard disk drive (HDD), or the like, and stores therein a system program, a machine learning application program, and the like that are executable by a processor (not shown) included in the machine learning device 40. The storage unit 409 further stores therein a trained model generated by the learning unit 408 (to be described later), and includes a training data extraction sign storage unit 4091.

The training data extraction sign storage unit 4091 stores therein, for example, work contents to be assigned as labels and specific motions (hand gestures, etc.) each indicating one of the work contents in association with each other.

Figure 3:
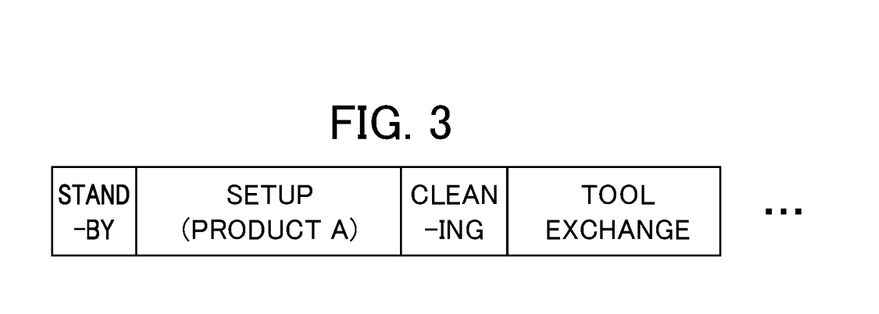
FIG. 3 illustrates an example of a time series of work.

FIG. 3 illustrates an example of a time series of work.

As illustrated in FIG. 3, the work contents include "standby", "setup for product A", "cleaning", and "tool exchange". The work content may be freely defined as, for example, "setup for product B" by a user such as a worker.

Figure 4A:
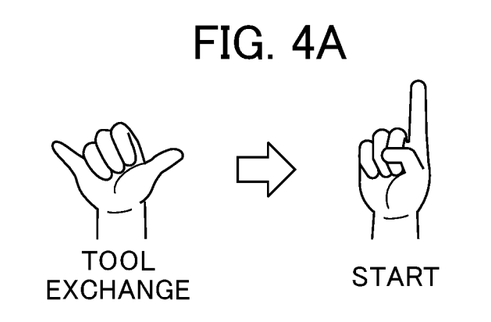
FIG. 4A is a diagram illustrating a hand gesture example that indicates tool exchange as a work content.
Figure 4B:
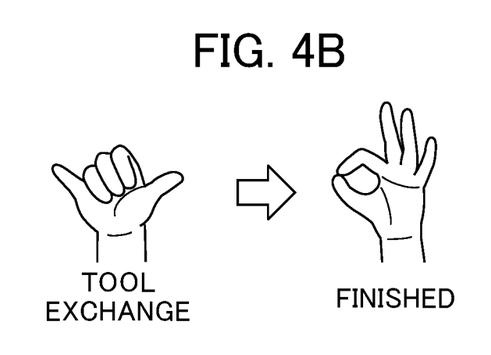
FIG. 4B is a diagram illustrating a hand gesture example that indicates tool exchange as a work content.

FIGS. 4A and 4B are each a diagram illustrating a hand gesture example that indicates tool exchange as a work content. FIG. 4A illustrates an example of a hand gesture indicating the start of tool exchange, and FIG. 4B illustrates an example of a hand gesture indicating the finish of tool exchange.

That is, the worker makes, toward the camera 20, a hand gesture (specific motion) that is pre-registered for each work content such as tool exchange when starting and finishing respective work, thereby explicitly indicating which work the worker is conducting. Thus, a piece of the video data is assigned with a label of the work content indicated by the hand gesture and can be used as training data.

This process facilitates collection of training data required for generating a trained model that determines a work content from the video data.

The video data acquisition unit 401 acquires video data captured by the camera 20 and including a worker, via the classification device 30.

The video data feature extraction unit 402 extracts features representing motions performed by the worker from the acquired video data.

Specifically, the video data feature extraction unit 402 extracts features of time series data regarding coordinates and angles of the joints (fingers, arms, legs, etc.) of the worker's body from the video data having clock time information added thereto, by means of a known method (e.g., Kosuke SUGANO, Kenta OKU, and Kyouji KAWA-GOE "Method for Motion Detection/Classification from Multi-Dimensional Time Series Data", DEIM Forum 2016 G4-5, or Shouhei UEZONO and Satoshi ONO, "Feature Extraction Using LSTM Autoencoder for Multimodal Sequential Data", Research Materials, the Japanese Society for Artificial Intelligence, SIG-KBS-B802-01, 2018). The video data feature extraction unit 402 further acquires statistical features (an average value, a peak value, etc.) extracted from the time series data regarding the coordinates and angles of the joints of the worker's body extracted from the video data. Furthermore, the video data feature extraction unit 402 determines a small motion on the basis of the coordinates and angles of the joints of the worker's body to thereby extracts a feature (i.e., determines whether or not the small motion constitutes a setup, such as operating a numerical controller (NC) or work conducted in the machine tool 10, and in the case of the setup, determines the clock time at which the setup has been performed, for example).

The video data feature extraction unit 402 may extract a feature representing a motion of the worker by means of the operation data regarding the machine tool 10 that is acquired by the operation data acquisition unit, which will be described later.

For example, the video data feature extraction unit 402 may grasp an opening/closing timing for a door of the machine tool 10 from the operation data, and may determine that a portion in the video data that changes at the same timing as the opening/closing timing is the door of the machine tool 10. As a result, the video data feature extraction unit 402 can extract a feature representing "work in the machine tool" in a case where the worker places his/her upper body in the inside in the portion in the video data. Furthermore, the video data feature extraction unit 402 may extract a feature representing, for example, "work at an automatic tool changer (ATC)" in a case where the worker's upper body is facing an upper portion of the machine tool 10, and may extract a feature representing, for example, "work at a table" when the worker's upper body is facing a lower portion of the machine tool 10.

In a case where the video data includes a portion that shows the worker pressing a button and corresponds to a timing when the worker performed an NC operation in the operation data, the video data feature extraction unit 402 may determine that the portion is an NC region. Thus, the video data feature extraction unit 402 can extract a feature representing "NC operation" in a case where the worker's hand is placed at the position.

In a case where a feature representing a hand gesture, which is a pre-registered specific motion, is extracted from the features extracted by the video data feature extraction unit 402, the training data extraction unit 403 labels a piece of the video data corresponding to the hand gesture with a work content indicated by the extracted hand gesture, and extracts, as training data, a set of input data that is the labeled piece of the video data and label data indicating the work content.

The operation data acquisition unit 404 acquires the operation data regarding the machine tool 10 via the classification device 30.

The operation data feature extraction unit 405 extracts a feature related to the extracted training data, from the operation data regarding the machine tool 10.

Specifically, the operation data feature extraction unit 405 calculates a time width from the clock time of the start and that of the end of the work of the training data extracted by the training data extraction unit 403, or calculates an average of time widths for each labeled work, for example.

Figure 5:
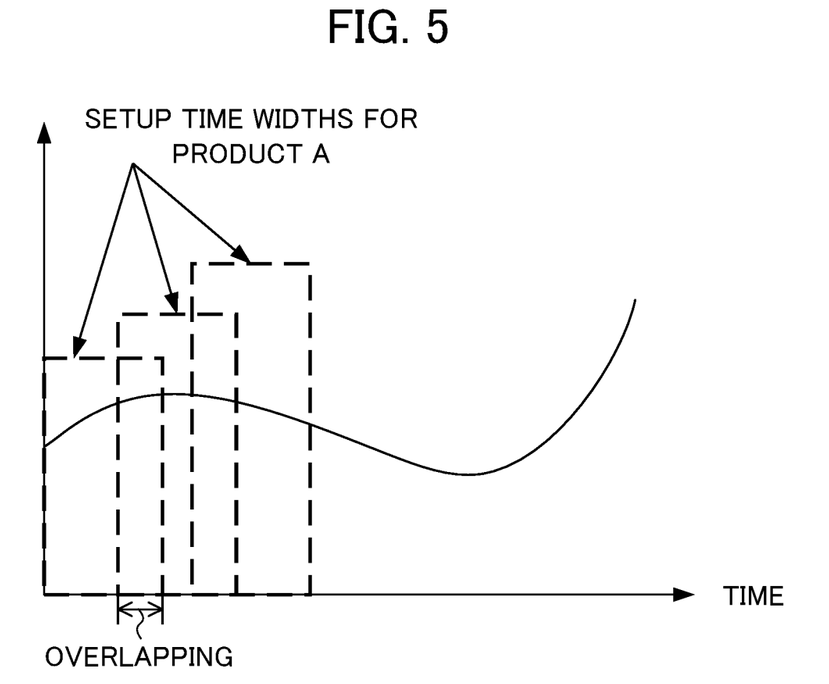
FIG. 5 is a diagram illustrating examples of setup time widths for a product A.

FIG. 5 is a diagram illustrating examples of time widths of the setup for a product A.

As illustrated in FIG. 5, the operation data feature extraction unit 405 calculates, in an overlapping manner, time widths of the setup for the product A, and segments the time according to the time widths. For each of the time segments, the operation data feature extraction unit 405 extracts, from the operation data regarding the machine tool 10, signal information of the machine tool 10 (e.g., the opening and closing of a chuck, an abnormal value for a tool calculated from torque of a motor) related to work to be classified, information (e.g., a machining program, a manufacturing number) for determining based on which whether or not the same machining is performed is determined, and an operation state of the machine tool 10 and transition of the operation states (e.g., a change from one work content to another, such as recovery to a normal operation from an alarming in tool exchange), as features of the operation data.

The video data feature extraction unit 402 may segment the video data according to time widths of work calculated in an overlapping manner, and extract a feature of the video data in each of the time segments, as in the case of the operation data feature extraction unit 405.

The labeling criterion creation unit 406 creates a labeling criterion for video data and a labeling criterion for operation data, based on the extracted feature of the video data of the training data and the extracted feature of the operation data.

Figure 6A:
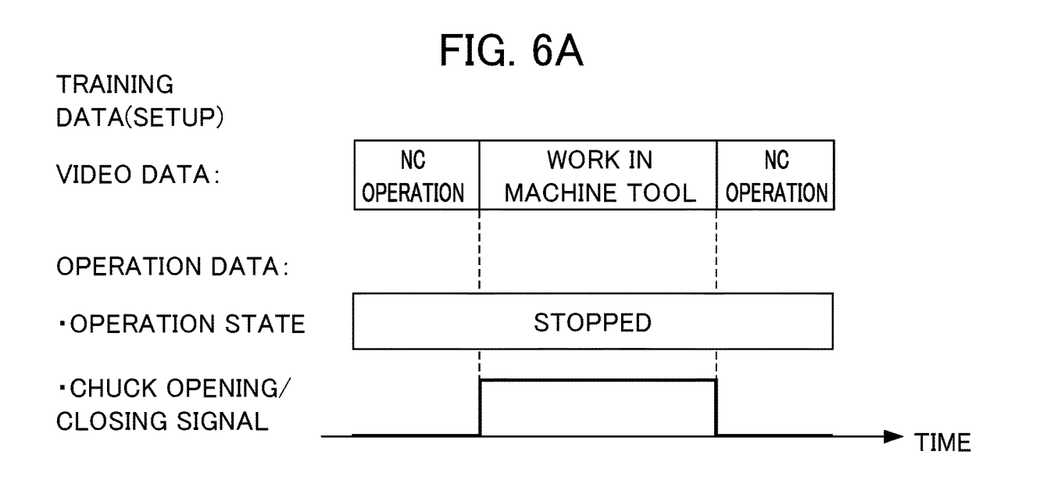
FIG. 6A is a diagram illustrating an example of training data for each work.
Figure 6B:
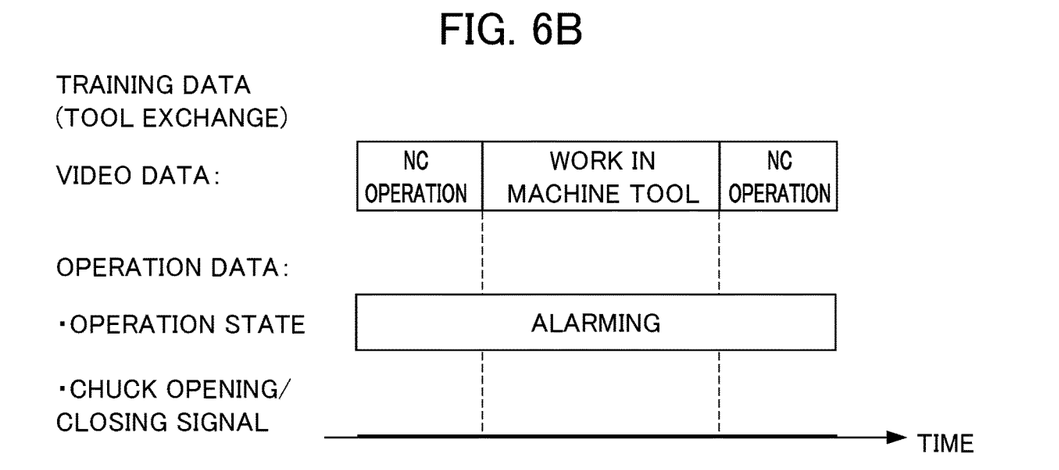
FIG. 6B is a diagram illustrating an example of training data for each work.

FIGS. 6A and 6B are diagrams each illustrating an example of training data for each work. FIG. 6A illustrates training data in a case of setup work (in a stopped operation state), and FIG. 6B illustrates training data in a case of tool exchange (in an alarming operation state). The chuck opening/closing signal in FIG. 6A changes from "closed" to "open" at the start of work in the machine tool, and changes from "open" to "closed" at the end of the work in the machine tool. On the other hand, the chuck opening/closing signal in FIG. 6B remains "closed" during work in the machine tool. The operation states include an in-operation state, a (network) disconnection state, an emergency stop state, a pause state, a manual operation state, and a warm-up operation state.

For each work included in the training data illustrated in FIGS. 6A and 6B, the labeling criterion creation unit 406 calculates an average of features extracted by the video data feature extraction unit 402, for example. For each work included in the training data, the labeling criterion creation unit 406 calculates a distance, such as a Mahalanobis' distance, between the calculated average of the features and a feature of an unlabeled piece of the video data, as a labeling criterion for video data.

In addition, the labeling criterion creation unit 406 calculates an average of features extracted by the operation data feature extraction unit 405 for each work included in the training date in FIGS. 6A and 6B. For each work included in the training data, the labeling criterion creation unit 406 calculates a distance, such as a Mahalanobis' distance, between the calculated average of the features and a feature of an unlabeled piece of the operation data, as a labeling criterion for operation data.

It should be noted that although the labeling criterion creation unit 406 calculates the distance, the present invention is not limited thereto, and for example, the labeling criterion creation unit 406 may perform machine learning (using, for example, a decision tree algorithm such as a classification and regression tree (CART)), create a classifier, and calculate a probability indicating classification of work.

The labeling unit 407 labels an unlabeled piece of the video data and an unlabeled piece of the operation data by performing semi-supervised learning, based on the labeling criterion for video data and the labeling criterion for operation data.

Specifically, for example, the labeling unit 407 calculates a weighted distance (criterion) based on the distances (criteria) of the video data and the operation data calculated by the labeling criterion creation unit 406 and according to "Formula 1", and in a case where the calculated distance is shorter than a certain distance, labels the unlabeled piece of the video data and the unlabeled piece of the operation data. The weighting factors "0.8" and "0.2" are non-limiting examples, and arbitrary values may be used.

Distance obtained using two criteria=Distance calculated from video data×0.8+distance calculated from operation data×0.2 (Formula 1)

The labeling unit 407 may be configured to determine which label is to be assigned to each of an unlabeled piece of the video data and an unlabeled piece of the operation data.

Due to this feature, the labeling unit 407 can label complex work based on a small amount of training data and, even if there is some difference in video data, the labeling unit 407 can assign a label because the features of the operation data are substantially the same.

In the case where the labeling criterion creation unit 406 has calculated a probability as a criterion for video data and a probability as a criterion for operation data, the labeling unit 407 may calculate a weighted probability based on the probabilities (criteria) for the video data and the operation data and according to "Formula 2", and label an unlabeled piece of the video data and an unlabeled piece of the operation data when the calculated probability is smaller than a certain probability.

Probability obtained using two criteria=probability calculated from video data×0.8+probability calculated from operational data×0.2 (Formula 2)

The labeling criteria (e.g., an average of features) may be sequentially updated using a labeled piece of the video data and a labeled piece of the operation data. For example, the labeling criteria creation unit 406 may recalculate a criterion from the training data and labeled data based on a known method (e.g., co-training according to a bootstrap method), and the labeling unit 407 may assign a label based on the recalculated criterion.

The learning unit 408 performs machine learning (e.g., gradient boosting, neural network, or the like) using the training data including a piece of the video data labeled by the labeling unit 407, and constructs a trained model 361 that classifies work that is being performed by the worker from inputted video data.

Then, the learning unit 408 provides the constructed trained model 361 to the classification device 30.

In a case where the learning unit 408 acquires training data including a set of input data that is a piece of new video data and label data indicating work content from the classification device 30 after having provided the trained model 361 to the classification device 30, the learning unit 408 may perform machine learning again using the acquired training data to update the trained model 361.

The learning unit 408 may perform online learning, batch learning, or mini-batch learning.

The online learning is a learning method in which supervised learning is performed without delay each time training data is acquired from the classification device 30. The batch learning is a learning method in which during a period in which training data is repeatedly acquired from the classification device 30, a plurality of training data are collected in accordance with the repetition, and supervised learning is performed using all the collected training data. The mini-batch learning is a learning method which is positioned between the online learning and the batch learning, and in which supervised learning is performed each time a certain amount of training data is accumulated.

The machine learning for generating the trained model 361 included in the classification device 30 has been described in the foregoing.

Next, the classification device 30 in the operation phase will be described.

<Classification Device 30 in Operation Phase>

As illustrated in FIG. 1, the classification device 30 in the operation phase includes an input unit 301, a work determination unit 302, a determination result writing unit 303, a determination result correction reading unit 304, a determined data analysis unit 305, and a storage unit 306.

The classification device 30 includes an arithmetic processing unit (not shown) such as a central processing unit (CPU) in order to perform functions of the functional blocks illustrated in FIG. 1. The classification device 30 further includes an auxiliary storage device (not shown) such as a ROM and a HDD that store therein various control programs, and a main storage device (not shown) such as a RAM that stores therein data temporarily required for the arithmetic processing device to execute the programs.

In the classification device 30, the arithmetic processing device reads the OS and application software from the auxiliary storage device, and performs arithmetic processing based on the OS and the application software while developing the read OS and application software in the main storage device. The classification device 30 controls each hardware component based on the calculation results. Thus, the functional blocks illustrated in FIG. 1 perform the respective processing. That is, the classification device 30 can be implemented by cooperation of hardware and software.

The storage unit 306 is a ROM, an HDD, or the like, and may include the trained model 361 and a determination result storage unit 362 together with various control programs.

The determination result storage unit 362 stores therein a determination result of determination made on a piece of video data by the work determination unit 302, which will be described later, in association with a feature of the determined piece of the video data.

The input unit 301 receives an input of the video data captured by the camera 20 and including a worker.

Based on the trained model 361, the work determination unit 302 determines work performed by the worker, from the video data received by the input unit 301.

The determination result writing unit 303 displays the determination result from the work determination unit 302 on a display unit (not shown) of the control device 110.

As a result, the worker can determine whether the classification made by the trained model 361 is correct or incorrect.

When there is an error in the determination result, the determination result correction reading unit 304 acquires the correct work content inputted by the worker via an input unit (not shown) such as a keyboard or a touch panel included in the control device 110, outputs a set of input data that is the determined piece of the video data and label data indicating the acquired correct work content to the machine learning device 40, and causes the machine learning device 40 to update the trained model 361.

For example, the reading of the result and the writing of the correction may be performed using the storage unit 306 to be described later, a PMC area, or the like.

The determined data analysis unit 305 detects the presence or absence of an abnormality in the feature based on the determination result and the feature of the determined piece of the video data that are stored in the determination result storage unit 362.

Figure 7:
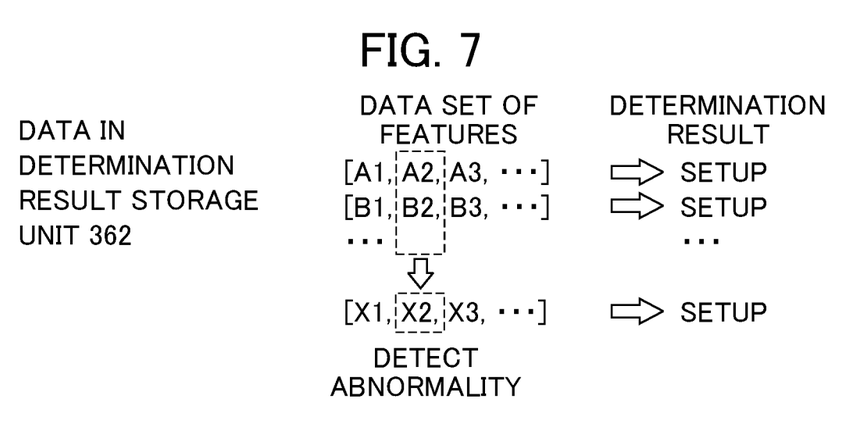
FIG. 7 illustrates an example of data stored in a determination result storage unit.

Specifically, as illustrated in FIG. 7, the determined data analysis unit 305 detects the presence or absence of an abnormality in the feature on the basis of pieces of data representing the same result in the determination result storage unit 362 by using a well-known algorithm for unsupervised detection of an abnormality, such as k-nearest neighbor algorithm.

Alternatively, for example, in a case where among 100 pieces of video data determined to indicate setup work, a feature representing a change from ON (open) to OFF (closed) of a chuck opening/closing signal is detected in 99 pieces of the video data, whereas a feature representing a change from ON (open) to OFF (closed) of the chuck opening/closing signal is not detected in one piece of the video data, the determined data analysis unit 305 may determine that the one piece of the video data for which the feature has not been detected is abnormal. It should be noted that such a one piece of the video data that is determined to be abnormal in this manner can also be determined to be abnormal by a well-known algorithm for unsupervised detection of abnormality, such as the k-nearest neighbor algorithm described above.

In response to detection of an abnormality in the feature such as the chuck opening/closing signal, the determined data analysis unit 305 may display the detection result on the display unit (not shown) of the control device 110.

In this way, the determined data analysis unit 305 detects an abnormality in the feature such as the chuck opening/closing signal, thereby making it possible to recognize an error in the determination result and detect an abnormality in the work content.

<Classification Process by Classification Device 30 in Operation Phase>

Next, the operation related to the classification process that is performed by the classification device 30 according to the present embodiment will be described.

Figure 8:
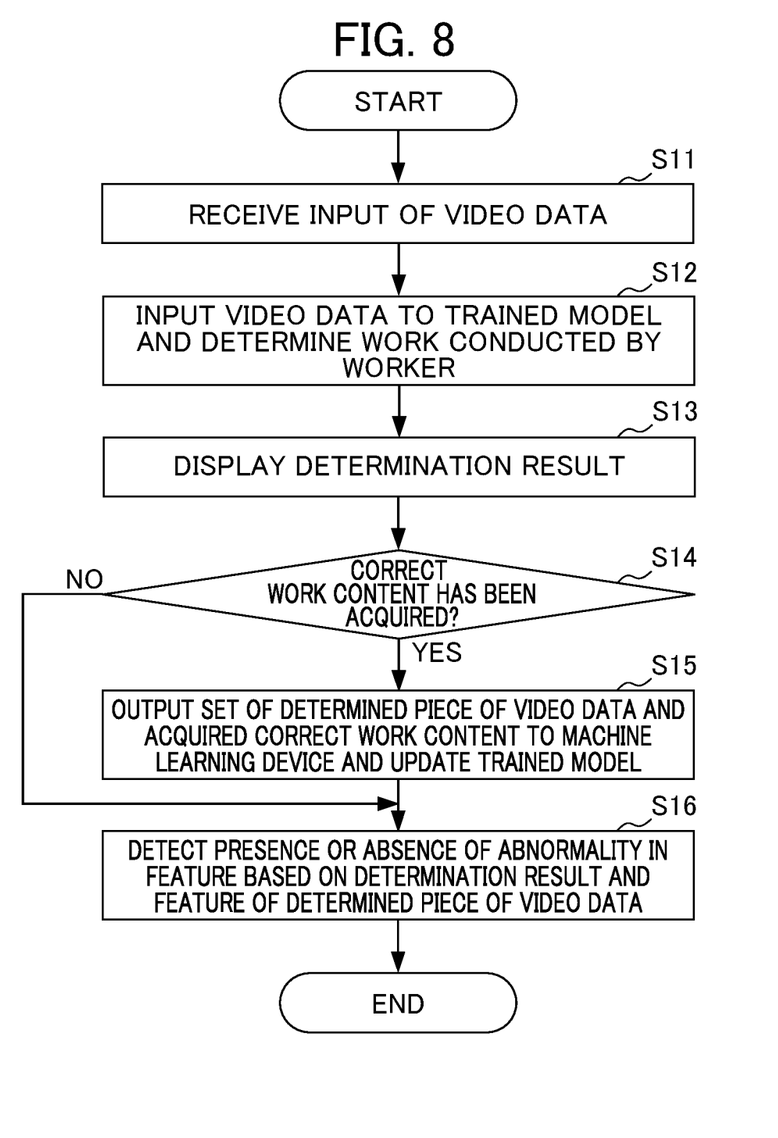
FIG. 8 is a flowchart illustrating classification process performed by a classification device in an operation phase.

FIG. 8 is a flowchart illustrating the classification process that is performed by the classification device 30 in the operation phase. The flow illustrated in FIG. 8 is repeatedly performed in a period during which video data is inputted from the camera 20.

In Step S11, an input of video data captured by the camera 20 and including the worker is received.

In Step S12, the work determination unit 302 inputs the video data received in Step S11 to the trained model 361, and determines work that the worker conducts.

In Step S13, the determination result writing unit 303 displays the determination result obtained in Step S12 on the display unit (not shown) of the control device 110.

In Step S14, the determination result correction reading unit 304 determines whether or not a correct work content inputted by the worker via the input unit (not shown) of the control device 110 has been acquired. When the inputted correct work content has been acquired, the process proceeds to Step S15. On the other hand, when an inputted correct work content has not been acquired, the process proceeds to Step S16.

In Step S15, the determination result correction reading unit 304 outputs a set of input data that is the determined piece of the video data and label data indicating the acquired correct work content to the machine learning device 40, and causes the machine learning device 40 to update the trained model 361.

In Step S16, the determined data analysis unit 305 detects the presence or absence of an abnormality in the feature based on the determination result and the feature of the determined piece of the video data that are stored in the determination result storage unit 362.

As described above, in response to the worker explicitly indicating the start and end of work by making the hand gesture, which is set for each work, toward the camera 20, the machine learning device 40 according to the embodiment extracts the training data including a set of input data that is a piece of the video data of the corresponding time period and label data indicating the work, and uses the operation data regarding the machine tool 10 collected at the same clock time as the training data as well, and thereby creates the labeling criterion for video data and the labeling criterion for operation data. The machine learning device 40 labels an unlabeled piece of the video data by performing semi-supervised learning based on the created criteria from viewpoints of both the video data and operation data. As a result, the machine learning device 40 can generate the trained model 361 having high determination accuracy even using a small amount of training data, and makes it easy to generate the trained model 361 without requiring a new device while placing a slight burden on the worker.

Furthermore, the classification device 30 can easily classify and recognize, from the camera 20, any complicate work conducted by the worker by using the trained model 361.

While one embodiment has been described in the foregoing, it should be noted that the classification device 30 and the machine learning device 40 are not limited to the embodiment described above, and encompass modifications, improvements, and the like as long as the object of the present disclosure can be achieved.

<Modification 1>

In the above-described embodiment, the machine learning device 40 described as a non-limiting example is separate from the control device 110 and the classification device 30. However, part or all of the functions of the machine learning device 40 may be included in the control device 110 or the classification device 30.

<Modification 2>

For example, in the above-described embodiment, the classification device 30 described as a non-limiting example is separate from the control device 110. However, part or all of the functions of the classification device 30 may be included in the control device 110.

Alternatively, part or all of the input unit 301, the work determination unit 302, the determination result writing unit 303, the determination result correction reading unit 304, the determined data analysis unit 305, and the storage unit 306 of the classification device 30 may be included in, for example, a server. Alternatively, the functions of the classification device 30 may be implemented using a virtual server function or the like on the cloud.

Moreover, the classification device 30 may be configured as a distributed processing system in which functions of the classification device 30 are appropriately distributed to a plurality of servers.

<Modification 3>

For example, in the above-described embodiment, the learning unit 408 performs machine learning using the training data including a set of input data that is a piece of the video data and label data indicating a work content, and constructs the trained model 361 that classifies work conducted by the worker from the inputted video data. However, this is a non-limiting example. For instance, in a case where the work determination unit 302 of the classification device 30 can acquire both the video data and the operation data, the learning unit 408 may perform machine learning using training data including a set of input data including a piece of the video data and a piece of operation data, and label data indicating a work content, and construct a trained model 361 that classifies work conducted by the worker from the inputted video data and the inputted operation data.

In one embodiment, the functions included in the classification device 30 and the functions included in the machine learning device 40 can be implemented by hardware, software, or a combination thereof. Here, the implementation by software means that a computer reads and executes a program for the implementation.

The components included in the classification device 30 and the components included in the machine learning device 40 can be implemented by hardware including an electronic circuit, etc., software, or a combination thereof. In the case where the components are implemented by software, programs constituting the software are installed in a computer. These programs may be recorded on a removable medium and distributed to users, or may be distributed by being downloaded to computers of users via a network. In the case where the components are implemented by hardware, part or all of the functions of the components included in the above-described device can be configured by an integrated circuit (IC) such as an application specific integrated circuit (ASIC), a gate array, a field programmable gate array (FPGA), a complex programmable logic device (CPLD), etc.

The programs can be stored in various types of non-transitory computer readable media and can be provided to a computer. The non-transitory computer readable media include various types of tangible storage media. Examples of the non-transitory computer readable media include a magnetic recording medium (e.g., a flexible disk, a magnetic tape, a hard disk drive), a magnetic-optical recording medium (e.g., a magnetic optical disk), a read only memory (CD-ROM), a CD-R, a CD-R/W, and a semiconductor memory (e.g., a mask ROM, a programmable ROM (PROM), an erasable PROM (EPROM), a flash ROM, and a RAM). The program may be provided to the computer by way of various types of transitory computer readable media. Examples of the transitory computer readable media include an electrical signal, an optical signal, and an electromagnetic wave. The transitory computer readable medium can provide a program to the computer through a wired communication line, such as a wire and an optical fiber, or through a wireless communication.

Steps of describing the program to be recorded on a recording medium include not only processes that are executed in time sequence according to the respective order, but also processes that are executed in parallel or individually and not necessarily in time sequence.

In other words, the machine learning device, the classification device, and the control device of the present disclosure can be implemented in various embodiments having the following configurations.

(1) The machine learning device 40 according to the present disclosure includes: the video data feature extraction unit 402 configured to extract features representing motions performed by a worker from video data captured by at least one camera 20 and including the worker; the training data extraction unit 403 configured to in a case of extracting a feature representing a pre-registered specific motion from among the features extracted by the video data feature extraction unit 402, label a piece of the video data corresponding to the extracted specific motion with a work content indicated by the extracted specific motion, and extract training data including a set of input data that is the labeled piece of the video data and label data indicating the work content; the operation data feature extraction unit 405 configured to extract from operation data regarding the machine tool 10 a feature related to the extracted training data; the labeling criterion creation unit 406 configured to create a labeling criterion for video data and a labeling criterion for operation data based on the feature of the piece of the video data included in the extracted training data and the feature extracted from the operation data; the labeling unit 407 configured to label an unlabeled piece of the video data and an unlabeled piece of the operation data based on the labeling criterion for video data and the labeling criterion the operation data; and the learning unit 408 configured to perform machine learning using the training data including the piece of the video data labeled by the labeling unit 407 and generates the trained model 361 that classifies work that is being performed by a worker from inputted video data.

The above-described machine learning device 40 can generate the trained model having high determination accuracy even using a small amount of training data.

(2) In the machine learning device 40 described in (1), the video data feature extraction unit 402 may extract, from the video data, a feature representing work that the worker performs in the machine tool 10 or a feature representing work that the worker performs with respect to the machine tool 10, based on a timing at which a change has taken place with respect to the machine tool 10 and a timing at which a change has taken place with respect to the machine tool 10 in the operation data.

In this way, the machine learning device 40 can generate the trained model 361 that can determine in more detail the content of work conducted by the worker.

(3) In the machine learning device 40 described in (1) or (2), the labeling criterion creation unit 406 may calculate, for each work of the training data, an average of the features extracted by the video data feature extraction unit 402, define a distance between the calculated average of the features and a feature of a unlabeled piece of the video data as the labeling criterion for video data for each work of the training data, calculate, for each work of the training data, an average of the features extracted by the operation data feature extraction unit 405, and define a distance between the calculated average of the features and an unlabeled piece of the operation data as the labeling criterion for operation data for each work of the training data.

Due to this feature, the machine learning device 40 can assign a label to complex work using a small amount of training data.

(4) The classification device 30 according to the present disclosure includes: the trained model 361 generated by the machine learning device 40 according to any one of (1) to (3); the input unit 301 configured to receive an input of video data captured by at least one camera 20 and including a worker; and the work determination unit 302 configured to determine work conducted by the worker from the video data received by the input unit 301 based on the trained model 361.

The above-described classification device 30 can highly accurately determine the work conducted by the worker from the video data.

(5) The classification device 30 described in (4) may include the determination result writing unit 303 configured to cause the control device 110, which controls the machine tool 10, to display a determination result from the work determination unit 302; and the determination result correction reading unit 304 configured to in a case where there is an error in the determination result, acquire a correct work content inputted to the control device 110, output a set of an input data that is the determined piece of the video data and label data indicating the acquired correct work content to the machine learning device 40, and cause the machine learning device 40 to update the trained model 361.

Due to this feature, the worker can determine whether the classification by the trained model 361 is correct or incorrect, and the classification device 30 can update the trained model 361 by receiving a correct work content from the worker.

(6) The classification device 30 according to (4) or (5) may include the determined data analysis unit 305 configured to detect the presence or absence of an abnormality in the feature based on the determination result from the work determination unit 302 and the feature of the determined piece of the video data.

Due to this feature, the classification device 30 detects the abnormality, thereby making it possible to recognize an error in the determination result and detect an abnormality in the work content.

(7) The classification device may include the machine learning device 40 according to any one of (1) to (3).

Due to this feature, the classification device 30 can provides the same effect as any one of the effects of (1) to (6) described above.

(8) The control device 110 of the present disclosure includes the classification device 30 according to any one of (4) to (7).

The control device 110 can provide the same effect as any one of the effects of (1) to (7) described above.

EXPLANATION OF REFERENCE NUMERALS

1: Control system
10: Machine tool
110: Control device
20: Camera
30: Classification device
301: Input unit
302: Work determination unit
303: Determination result writing unit
304: Determination result correction reading unit
305: Determined data analysis unit
361: Trained model 362: Determination result storage unit
40: Machine learning device
401: Video data acquisition unit
402: Video data feature extraction unit
403: Training data extraction unit
404: Operation data acquisition unit
405: Operation data feature extraction unit
406: Labeling criterion creation unit
407: Labeling unit
408: Learning unit
4091: Training data extraction sign storage unit

The invention claimed is:

1. A machine learning device comprising:
a video data feature extraction unit configured to extract features representing motions performed by a worker from video data captured by at least one camera and including the worker;
a training data extraction unit configured to in a case of extracting a feature representing a specific motion that is pre-registered, from among the features extracted by the video data feature extraction unit, label a piece of the video data corresponding to the extracted feature representing the specific motion with a work content indicated by the extracted feature representing the specific motion, and extract training data including a set of input data that is the labeled piece of the video data and label data indicating the work content;
an operation data feature extraction unit configured to extract, from operation data regarding a machine tool, a feature related to the extracted training data;
a labeling criterion creation unit configured to create a labeling criterion for the video data and a labeling criterion for the operation data based on a feature of the labeled piece of the video data included in the extracted training data and the feature extracted from the operation data;
a labeling unit configured to label an unlabeled piece of the video data and an unlabeled piece of the operation data based on the labeling criterion for the video data and the labeling criterion for the operation data; and
a learning unit configured to perform machine learning using the extracted training data including the labeled piece of the video data labeled by the labeling unit, and generates a trained model that classifies work that is being conducted by the worker from inputted video data.

2. The machine learning device according to claim 1, wherein
the video data feature extraction unit extracts, from the video data, a feature representing a motion that the worker performs in the machine tool or a feature representing an operation that the worker performs with respect to the machine tool, based on a timing at which a change has taken place with respect to the machine tool in the video data and a timing at which a change has taken place with respect to the machine tool in the operation data.

3. The machine learning device according to claim 1, wherein
the labeling criterion creation unit calculates, for each work of the extracted training data, an average of features extracted by the video data feature extraction unit, defines a distance between the calculated average of the features extracted by the video data feature extraction unit and a feature of an unlabeled piece of the video data as a labeling criterion for the video data for each work of the extracted training data, calculates, for each work of the extracted training data, an average of features extracted by the operation data feature extraction unit, and defines a distance between the calculated average of the features extracted by the video data feature extraction unit and an unlabeled piece of the operation data as a labeling criterion for the operation data for each work of the extracted training data.

4. A classification device comprising:
a trained model generated by the machine learning device according to claim 1;
an input unit configured to receive the inputted video data captured by at least one camera and including the worker; and
a work determination unit configured to determine, based on the trained model, work conducted by the worker from the inputted video data received by the input unit.

5. The classification device according to claim 4, further comprising:
a determination result writing unit configured to cause a control device to display a determination result from the work determination unit, the control device being configured to control the machine tool; and
a determination result correction reading unit configured to in a case where there is an error in the determination result, acquire a correct work content inputted to the control device, output to the machine learning device a set of an input data that is a determined piece of the video data and label data indicating the acquired correct work content, and cause the machine learning device to update the trained model.

6. The classification device according to claim 5, further comprising:
a determined data analysis unit configured to detect presence or absence of an abnormality in a feature based on the determination result from the work determination unit and the feature of the determined piece of the video data.

7. A control device comprising:
the classification device according to claim 4.

* * * * *